United States Patent
Kim

(10) Patent No.: US 9,538,086 B2
(45) Date of Patent: Jan. 3, 2017

(54) METHOD OF PERFORMING PREVIEWING AND ELECTRONIC DEVICE FOR IMPLEMENTING THE SAME

(71) Applicant: Samsung Electronics Co., Ltd., Gyeonggi-do (KR)

(72) Inventor: Kwangtai Kim, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 36 days.

(21) Appl. No.: 14/574,206

(22) Filed: Dec. 17, 2014

(65) Prior Publication Data
US 2015/0172552 A1    Jun. 18, 2015

(30) Foreign Application Priority Data
Dec. 17, 2013    (KR) .................. 10-2013-0157555

(51) Int. Cl.
| | | |
|---|---|---|
| *H04N 5/232* | (2006.01) | |
| *H04N 5/262* | (2006.01) | |
| *H04N 5/272* | (2006.01) | |
| *H04N 5/45* | (2011.01) | |

(52) U.S. Cl.
CPC ........ *H04N 5/23293* (2013.01); *H04N 5/2624* (2013.01); *H04N 5/272* (2013.01); *H04N 5/45* (2013.01)

(58) Field of Classification Search
CPC .. H04N 5/23293; H04N 5/2624; H04N 5/272; H04N 5/45; H04N 5/2258; H04N 5/23219
See application file for complete search history.

(56) References Cited

U.S. PATENT DOCUMENTS

| | | | |
|---|---|---|---|
| 2003/0117501 A1 | 6/2003 | Shirakawa | |
| 2007/0140675 A1 | 6/2007 | Yanagi | |
| 2011/0249073 A1 | 10/2011 | Cranfill et al. | |
| 2012/0120186 A1* | 5/2012 | Diaz | H04N 5/2258 348/36 |
| 2012/0299950 A1* | 11/2012 | Ali | G02B 27/0176 345/592 |
| 2013/0176254 A1* | 7/2013 | Lee | G06F 3/041 345/173 |
| 2013/0182062 A1* | 7/2013 | Son | H04N 7/144 348/14.07 |
| 2013/0222663 A1 | 8/2013 | Rydenhag et al. | |

(Continued)

FOREIGN PATENT DOCUMENTS

KR    10-2008-0044132    5/2008

OTHER PUBLICATIONS

Extended European Search Report dated May 6, 2015 in connection with Application No. 14192903.4-1902, 7 pages.

*Primary Examiner* — Timothy J Henn

(57) ABSTRACT

An electronic device is configured to perform a method of previewing images photographed by a plurality of cameras. The method includes displaying a main preview image of a first one of the cameras, and displaying a sub preview image of a second one of the cameras in the main preview image; changing a property of the sub preview image in response to movement of the electronic device; and when the movement of the electronic device stops, restoring the changed property to an original property before the changing.

10 Claims, 8 Drawing Sheets

(56) References Cited

U.S. PATENT DOCUMENTS

2014/0118600 A1* 5/2014 Son .................... H04N 5/23293
348/333.11
2014/0192245 A1* 7/2014 Lee .................... H04N 5/23293
348/333.05

* cited by examiner

METHOD OF PERFORMING PREVIEWING AND ELECTRONIC DEVICE FOR IMPLEMENTING THE SAME

CROSS-REFERENCE TO RELATED APPLICATION(S) AND CLAIM OF PRIORITY

The present application is related to and claims the benefit under 35 U.S.C. §119(a) of a Korean patent application filed on Dec. 17, 2013 in the Korean Intellectual Property Office and assigned Serial No. 10-2013-0157555, the entire disclosure of which is hereby incorporated by reference.

TECHNICAL FIELD

The present disclosure relates to a method of previewing images photographed by cameras and an electronic device for implementing the same.

BACKGROUND

Generally, an electronic device such as a smart phone, a cellular phone, etc. has a camera, previews an image photographed by a camera to a user, and stores the image photographed by the camera in a memory in response to selecting of a shutter key of the electronic device by the user. The electronic device may have two or more cameras, and may operate in a multi-preview mode in which images corresponding to the cameras are previewed.

SUMMARY

It is a primary object to provide a multi-preview mode in a Picture In Picture (PIP) preview mode. An image of one (e.g., a first camera) of a plurality of cameras may be displayed on a screen, and an image of at least another one (e.g. a second camera) may be displayed inside the image of the first camera.

A user can move the electronic device in order to adjust a size, a location, a focus, etc. of a specific subject (e.g., a face, a landscape, etc.) in the image of the first camera, to compose what the user desires. When the electronic device is in the PIP preview mode, the specific subject in the image of the first camera is covered by the image of the second camera. In this case, there is the inconvenience that the user should move the image of the second image to another place. Thus, in accordance with such a method of performing previewing, the image of the second camera may be a disturbance element which disrupts adjusting of the image of the first camera to the desired composition. In the following description, the image of the first camera is referred to as a main preview image, and the image of the second camera included therein is referred to as a sub preview image.

An aspect of the present disclosure is to provide a method of adjusting the main preview image to the sub preview image without reserve with the composition which the user desires, and an electronic device for implementing the same.

An aspect of the present disclosure is to provide a method of previewing images photographed by a plurality of cameras, by an electronic device. The method includes displaying a main preview image of a first one of the cameras, and displaying a sub preview image of a second one of the cameras within the main preview image; changing a property of the sub preview image in response to a movement of the electronic device; and when the movement of the electronic device stops, restoring the changed property to an original property before the changing.

Another aspect of the present disclosure is to provide a method of previewing images photographed by a plurality of cameras, by an electronic device. The method includes displaying a main preview image of a first one of the cameras, and displaying a sub preview image of a second one of the cameras within the main preview image; when a function relating to the main preview image is executed, changing the property of the sub preview image; and when the function is terminated, restoring the changed property to an original property before the changing.

Another aspect of the present disclosure is to provide an electronic device. The electronic device includes a plurality of cameras; a display unit configured to preview images photographed by the cameras; a sensor unit configured to detect movement of the electronic device; and a processor configured to control the display unit to display, in a main preview image of a first one of the cameras, a sub preview image of a second one of the cameras, change a property of the sub preview image in response to the movement of the electronic device, and restore the changed property to an original property before the changing when the movement of the electronic device stops.

Another aspect of the present disclosure is to provide a portable electronic device. The portable electronic device includes a plurality of cameras; a display unit configured to preview images photographed by the cameras; a sensor unit configured to detect a movement of the electronic device; a memory configured to store a camera application; and a processor configured to control the display unit to display, in a main preview image of a first one of the cameras, a sub preview image of a second one of the cameras, change a property of the main preview image when a function relating to the main preview image is executed, and restore the changed property to an original property before the changing.

An electronic device according to the present disclosure can adjust a main preview image to a sub preview image without reserve to have a composition which a user desires.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
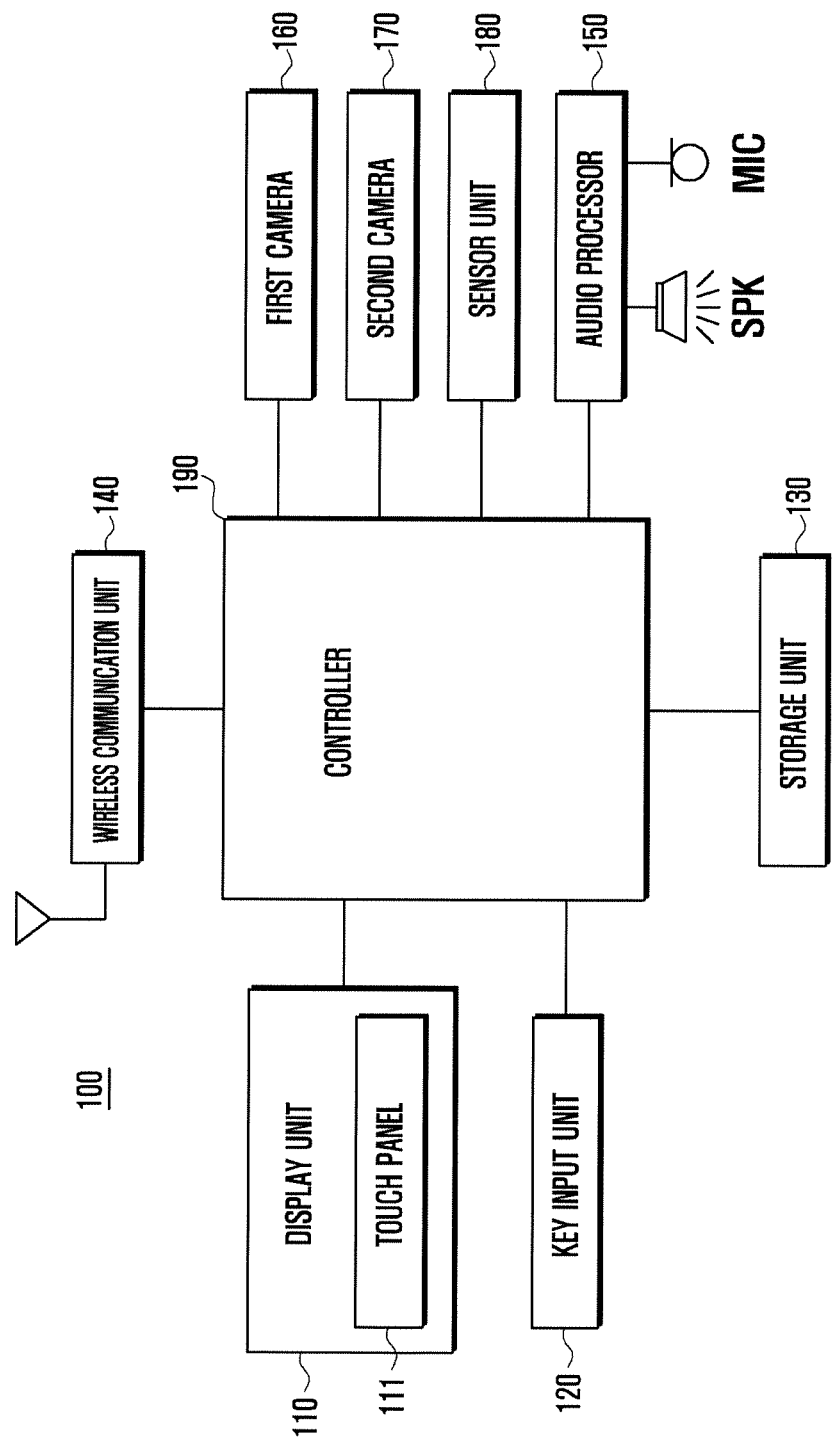
FIG. 1 is a block diagram illustrating an electronic device according an embodiment of the present disclosure.

FIGS. 1 through 5, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged electronic device.

Hereinafter, various embodiments will be described in detail with reference to the accompanying drawings. It should be noted that the same elements will be designated by the same reference numerals although they are shown in different drawings. Further, a detailed description of a known function and configuration which may make the subject matter of the present disclosure unclear will be omitted. Hereinafter, it should be noted that only the descriptions will be provided that may help understanding the operations provided in association with the various embodiments of the present disclosure, and other descriptions will be omitted to avoid making the subject matter of the present disclosure rather unclear.

An electronic device according to the present disclosure corresponds to a portable device having two or more cameras (e.g., dual cameras), and may include, for example, a smart phone, a tablet Personal Computer (PC), a mobile phone, a video phone, a digital camera, a Personal Digital Assistant (PDA), a Portable Multimedia Player (PMP), a camcorder, etc. It is obvious to those skilled in the art that the electronic device according to the present disclosure is not limited to the aforementioned devices. Hereinafter, the electronic device according to the present disclosure and a method of performing previewing implemented by the same will be described in detail.

FIG. 1 is a block diagram illustrating an electronic device according an embodiment of the present disclosure.

Referring to FIG. 1, an electronic device 100 according to an embodiment of the present disclosure may include a display unit 110, a key input unit 120, a storage unit 130, a wireless communication unit 140, an audio processor 150, a speaker SPK, a microphone MIC, a first camera 160, a second camera 170, a sensor unit 180 and a controller 190.

The display unit 110 displays data on a screen under a control of the controller 190. That is, when the controller 190 processes (e.g. decodes or resizes) data and stores the data in a memory (e.g. an internal memory of the display unit 110 or the storage unit 130), the display unit 110 converts the data stored in the memory into an analog signal and displays the corresponding data. When electric power is supplied to the display unit 110, the display unit 110 displays a locking image on the screen. When unlocking information is detected while displaying the locking image, the controller 190 unlocks the screen. That is, the display unit 110 displays a home image instead of the locking image under the control of the controller 190. The home image includes a background image (e.g. a picture set by a user) and various icons displayed therein. Here, the icons indicate applications or contents (e.g. a picture file, a video file, a voice recording file, a document, a message, etc.), respectively. When a user selects one of the icons, for example, an icon of a camera application, the controller 190 executes the camera application and controls the display unit 110 to display a preview image of a camera. The display unit 110 receives the preview image from the controller 190, and converts the received preview image into an analog signal to output the analog signal. Further, the display unit 110 can overlap and display a menu to control a function of the cameras 160 and 170, on the preview image. Such a menu includes a shutter key, and the controller 190 controls the cameras 160 and 170 in response to selection of the menu by a user. The preview image is obtained by reducing raw data having high resolution to an image having low resolution in accordance with a size of a screen. The raw data is generated by the camera, and implies an image having an unprocessed digital form.

The display unit 110 displays images in a multi-layered structure on a screen under the control of the controller 190. For example, the display unit 110 displays a first preview image of the first camera 160 on the screen, and displays a second preview image of the second camera 170 within the first preview image. In some embodiments, an area where the first preview image is displayed may be an entirety of the screen, and an area where the second preview image is displayed may be a part of the screen. Thus, a user can view the second preview image, and can view not the entirety of the first preview image, but a part of the first preview image. Of course, the display unit 110 can display the second preview image on an entirety of the screen under the control of the controller 190. In some embodiments, the second preview image may be displayed opaquely. Accordingly, the user may also view the entirety of the first preview image. Further, all of the preview images may be displayed on an uppermost layer of the screen. That is, the display unit 110 displays the first preview image on a first area of the screen, and displays the second preview image on a second area not overlapping the first area, under the control of the controller 190. In this way, a function of displaying the first preview image and the second preview image may refer to a Picture In Picture (PIP) preview or a dual preview, and an operation mode in which such a function is executed may refer to a PIP preview mode or a dual preview mode. Further, a function of displaying only one preview image may refer to a single preview image, and an operation mode in which such a function is executed may refer to a single preview mode.

The display unit 110 may include a panel or a hologram. The panel may be, for example, an Liquid Crystal Display (LCD), an Active Matrix Organic Light Emitting Diode (AM-OLED), and the like. The panel may be implemented to be, for example, flexible, transparent, or wearable. The panel may be configured by a touch panel 111 and one module. The hologram can display a three-dimensional image in the air by using interference of the light. The display unit 110 may further include a control circuit for controlling a panel or a hologram.

The touch panel 111 is installed in the screen of the display unit 110. In particular, the touch panel 111 is implemented with an add-on type touch panel which is placed on the screen of the display unit 110, or an on-cell type or in-cell type touch panel which is inserted into the display unit 110.

The touch panel 111 can detect a touch input by using at least one of a capacitive scheme, a resistive touch panel, an infrared scheme, and a surface acoustic wave scheme. Also, the touch panel 111 may further include a controller (not illustrated). For example, the controller determines a representative among touch coordinates from the recognized touch input, and transfers the determined touch coordinates to the controller 190. Of course, such a control may be performed by the controller 190.

In the case of the capacitive scheme, the touch panel can recognize an indirect touch as well as a direct touch. The "direct touch scheme" may refer to a scheme in which a conductive material (e.g. a finger or a stylus pen) makes a direct contact with a touch screen. According to an embodiment, the "indirect touch scheme" may refer to a scheme in which a conductive material wrapped by a non-conductive material (e.g. a finger wearing a glove) approaches a touch screen or the non-conductive material (e.g. a glove which a finger is wearing) contacts the touch screen. According to another embodiment, the "indirect touch scheme" may refer to a scheme in which a finger touches a non-conductive object in a state in which the non-conductive object (e.g., a cover for protecting a touch screen) is placed on the touch screen and is in contact with the touch screen. According to yet another embodiment, the "indirect touch scheme" may refer to a scheme commonly called "hovering", in which a finger is not in contact with a touch screen, and approaches the touch screen within a predetermined distance so as to generate an event. The touch panel 111 may further include a tactile layer (not illustrated). In this case, the touch panel 111 may provide a user with a tactile reaction.

The key input unit 120 may be configured to include at least one touch key. The touch key refers to all types of input means that may recognize a touch or an approach of a body part and an object, generally. For example, a touch key may include a capacitive touch key which senses an approach of a body part or an object that is capacitive, and recognize the sensed approach as a user input. The touch key may generate a touch event in response to a touch of the user and may transmit the generated touch event to the controller 190. The key input unit 120 may further include a key having a type different from the touch type. For example, the key input unit 120 may include at least one dome key. When the user presses the dome key, the dome key is transformed to be in contact with a printed circuit board, and accordingly, a key event is generated on the printed circuit board and is transmitted to the controller 180.

The key input unit 120 may include a shutter key. Such a shutter key may be a touch key or another key or keys (e.g. the dome key). When the shutter key is pressed, the key input unit 120 generates an event and transfers the generated event to the controller 190. For example, when the user firmly presses the shutter key, the key input unit 120 may generate a shutter event in response to the pressing manipulation. The controller 190 may store an image photographed by a camera, for example, the first camera 160, in the storage unit 130 in response to the shutter event. When the user relatively weakly presses the shutter key, the shutter key may be in a so-called half shutter state. Accordingly, the key input unit 120 may generate a half shutter event. The controller 190 may perform a predetermined specific function in response to the half shutter event. For example, when the electronic device 100 operates in an auto focus mode, the controller 190 switches a focus mode into a manual focus mode in response to the half shutter event. Further, the key input unit 120 may further include a zoom-in key and a zoom-out key. The controller 190 may control a front camera, for example, the second camera 170, to perform photographing while zooming in a subject, in response to a zoom-in event. The controller 190 may control the first camera 160 to perform photographing while zooming out a subject, in response to a zoom-out event.

The key input unit 120 may further include keys corresponding to various functions relating to the camera application, in addition to the shutter key, the zoom-in key, and the zoom-out key. The functions relating to the camera applications may include, for example, auto focusing, skin correction, landscape photographing, macro, animated photo, night photographing, gallery loading, International Organization for Standardization (ISO) sensitivity adjustment, diaphragm adjustment, voice activated shutter, luminance adjustment, resolution adjustment, white balance adjustment, self-timer setting, photographing voice setting, tagging of location information on a photographed picture, preview mode switching, etc. Here, the animated photo may be a function of photographing video of a moving subject and then making the photographed moving image to be a picture of which only the selected part is moved or fixed. The macro may be a function for close-up photographing.

A key included in the key input unit 120 may be a hard key. A soft key, a menu, or an icon corresponding to such a hard key may be displayed on the screen.

The storage unit 130 stores data generated by the electronic device 100 or received from an external device (e.g., a server, a desk top PC, a tablet PC and the like), through the wireless communication unit 140, under the control of the controller 190. Further, the storage unit 130 stores a booting program, at least one operating system, and at least one application. Further, the storage unit 130 may store various pieces of setting information (e.g. screen brightness, whether to generate a vibration when a touch is generated, whether to automatically rotate a screen, and the like) for setting a use environment of the electronic device 100. Accordingly, the controller 190 may operate the electronic device 100 with reference to the setting information.

The storage unit 130 may include a main memory and a secondary memory. The main memory may include, for example, a Random Access Memory (RAM), etc. The secondary memory may include a disk, a RAM, a Read-Only Memory (ROM), a flash memory, etc. The main memory may store various programs, e.g., a booting program, an operating system, and an application, loaded from the secondary memory. When electric power of a battery is supplied to the controller 190, the booting program may be loaded first to the main memory. Such a booting program may load the operating system to the main memory. The operating system may load the application to the main memory. The controller 190 (e.g., an Application Processor (AP)) can access the main memory to decode a command (routine) of the program, and can execute a function according to the decoded result. That is, various programs operate as processes while being loaded to the main memory.

The storage unit 130 may further include an external memory. For example, the storage unit 130 may include a Compact Flash (CF), a Secure Digital (SD), a Micro Secure Digital (Micro-SD), a Mini Secure Digital (Mini-SD), an eXtreme Digital (xD), a memory stick, etc., as external memories.

The wireless communication unit 140 performs a voice call, a video call, or data communication with the external devices through the network, under the control of the controller 190. The wireless communication unit 140 includes a wireless frequency transmission unit for up-converting and amplifying a frequency of a signal to be transmitted, and a wireless frequency reception unit for low-noise-amplifying and down-converting a frequency of a received signal. Further, the wireless communication unit 140 includes a mobile communication module (e.g., a 3rd generation mobile communication module, a 3.5rd generation mobile communication module, a 4th generation mobile communication module, etc.), a digital broadcasting module (e.g., a DMB module), and a short-range communication module (e.g. a Wi-Fi module, a Bluetooth module and a Near Field Communication (NFC) module).

The audio processor 150 may receive and output an audio signal (e.g. voice data) for voice recognition, voice recording, digital recording, and voice call while being combined with the speaker SPK and the microphone MIC. The audio processor 150 receives an audio signal from the controller 190, converts the received audio signal from a digital form to an analog form, amplifies the converted signal, and outputs the converted signal to the speaker SPK. The audio processor 150 converts an audio signal, received from the microphone MIC, from an analog form to a digital form, and then provides the converted signal to the controller 190. The speaker SPK converts an audio signal received from the audio processor 150 into a sound wave, and outputs the sound wave. The microphone MIC converts a sound wave transferred from a person or other sound sources into an audio signal.

The first camera 160 and the second camera 170 perform a function of photographing a subject and outputting the subject to the controller 190, under the control of the controller 190. In detail, the cameras 160 and 170 may include a lens for collecting light, an image sensor for converting the light into an electric signal, and an Image Signal Processor (ISP) for processing the electric signal input from the image sensor into raw data and outputting the processed electric signal to the controller 190. Here, the ISP processes raw data into a preview image and outputs the preview image to the controller 190, under the control of the controller 190. Then, the controller 190 controls the display unit 110 to display the preview image on the screen. Further, the ISP processes raw data into a compressed image (e.g., a JPEG type) and outputs the preview image to the controller 190, under the control of the controller 190. The controller 190 detects a shutter event (e.g., an operation in which a user taps a shutter button displayed on the display unit 110) from the touch panel 111 or the key input unit 120, and stores the compressed image in the storage unit 130, in response to the shutter event.

The rear camera (e.g. the first camera 160) connects the lens and the image sensor to each other, and includes a barrel which is a passage through which the light received by the lens passes, a controller which encloses the barrel and adjusts a focal distance, a motor for rotating the controller, and a rotation detection unit for, when the controller rotates, generating rotation detection information corresponding to the rotation and transferring the rotation detection information to the controller 190. The first camera 160 can make an image of the subject to be accurately formed on an image sensor by driving the controller through controlling the motor. Accordingly, the subject can be clearly displayed. Such a controller can be manipulated manually. For example, the user can adjust the shutter key to be in the half shutter state, and then manually adjust the focal distance by rotating the controller in a clockwise direction or in a counterclockwise direction. The image of the subject is accurately formed on the image sensor according to the manual focus adjustment.

Further, the first camera 150 may include a plurality of zoom rings. Such a zoom ring may refer to a focusing ring. For example, an interval between the zoom rings may be narrowed or widened as the controller rotates. When the interval is narrowed, a distance between an objective lens of the lens and the image sensor may be shortened. When the interval is widened, a distance between an objective lens of the lens and the image sensor may be relatively lengthened. Here, the lens may include the objective lens and an ocular lens. The objective lens corresponds to a lens located to be the most adjacent to the subject to form an image of the subject, and the ocular lens corresponds to a lens for enlarging the image made by the objective lens.

The sensor unit 180 detects a physical quantity (e.g., acceleration, pressure, an amount of light, etc.) or a change in them, generates detection information (e.g., an amount $\Delta v$ of a change in a voltage), and transfers the detection information to the controller 190. Further, the sensor unit 180 detects an operation state (e.g., movement) of the electronic device 100, generates detection information of the operation state, and transfers the detection information to the controller 190.

The sensor unit 180 may include at least one of (for example) a gesture sensor, a gyro sensor, a pressure sensor, a magnetic sensor, an acceleration sensor, a grip sensor, a proximity sensor, an RGB sensor, a bionic sensor, a temperature/humidity sensor, an luminance sensor and an Ultra Violet (UV) sensor. The sensor unit 180 may further include (for example) an olfactory sensor (not illustrated), an ElectroMyoGraphy (EMG) sensor (not illustrated), an ElectroEncephaloGram (EEG) sensor (not illustrated), an ElectroCardioGram (ECG) senor (not illustrated), a fingerprint sensor, etc. The sensor unit 180 may further include a control circuit for controlling at least one sensor included therein. Further, the sensors included in the sensor unit 180 may be implemented by one chip obtained by integrating the sensors therein, or by separate chips.

The controller 190 controls overall operations of the electronic device 100 and a signal flow between internal components of the electronic device 100, performs a function of processing data, and controls the supply of electric power from the battery to the components. Especially, the controller 190 controls a preview in response to a gesture of the user. Such a user's gesture can be detected through at least one of the touch panel 111 and the camera (e.g., the second camera 170) disposed on the same surface as the screen.

The controller 190 may include one or more processors. For example, the controller 190 may include one or more Application Processors (APs) 211 or one or more Communication Processors (CPs) 213. The AP and the CP may be integrated into one package made by one integrated circuit. Alternatively, the AP and the CP may be included in different packages.

The AP may control a plurality of hardware and a plurality of software by operating the operating system or the application, and may perform processing and calculation of various pieces of data. The AP may be implemented by, for example, a System on Chip (SoC). According to an embodiment of the present disclosure, the controller 190 may further include a Graphic Processing Unit (GPU) (not illustrated).

The CP can perform a function of managing a data link and converting a communication protocol, at a time of communication between other external devices connected with the electronic device 100 through a network. The CP may be implemented by, for example, a SoC. According to an embodiment of the present disclosure, the CP may perform at least a portion of a multimedia control function. The CP may perform distinction and authentication of the terminal in a communication network, by using a subscriber identification module (e.g., a Subscriber Identity Module (SIM) card). Further, the CP may provide a user with services, such as a voice call service, a video call service, a text message service, a packet data service, etc. Further, the CP may control data transmission/reception of the wireless communication unit 140.

According to an embodiment, the AP or the CP can process a command or data received from at least one of the non-volatile memory and other components of the electronic device 100 by loading the command or the data in the volatile memory. Further, the AP or the CP may store data received from at least one of the other components or data generated by at least one of the other components, in the non-volatile memory.

The electronic device 100 may further include an ear-jack, a Global Positioning System (GPS) module, a vibration motor, an accessory, etc., which are not mentioned above. Here, the accessory may be, for example, a pen for touch, as a component of the electronic device, which is detachable from the electronic device 100.

Figure 2:
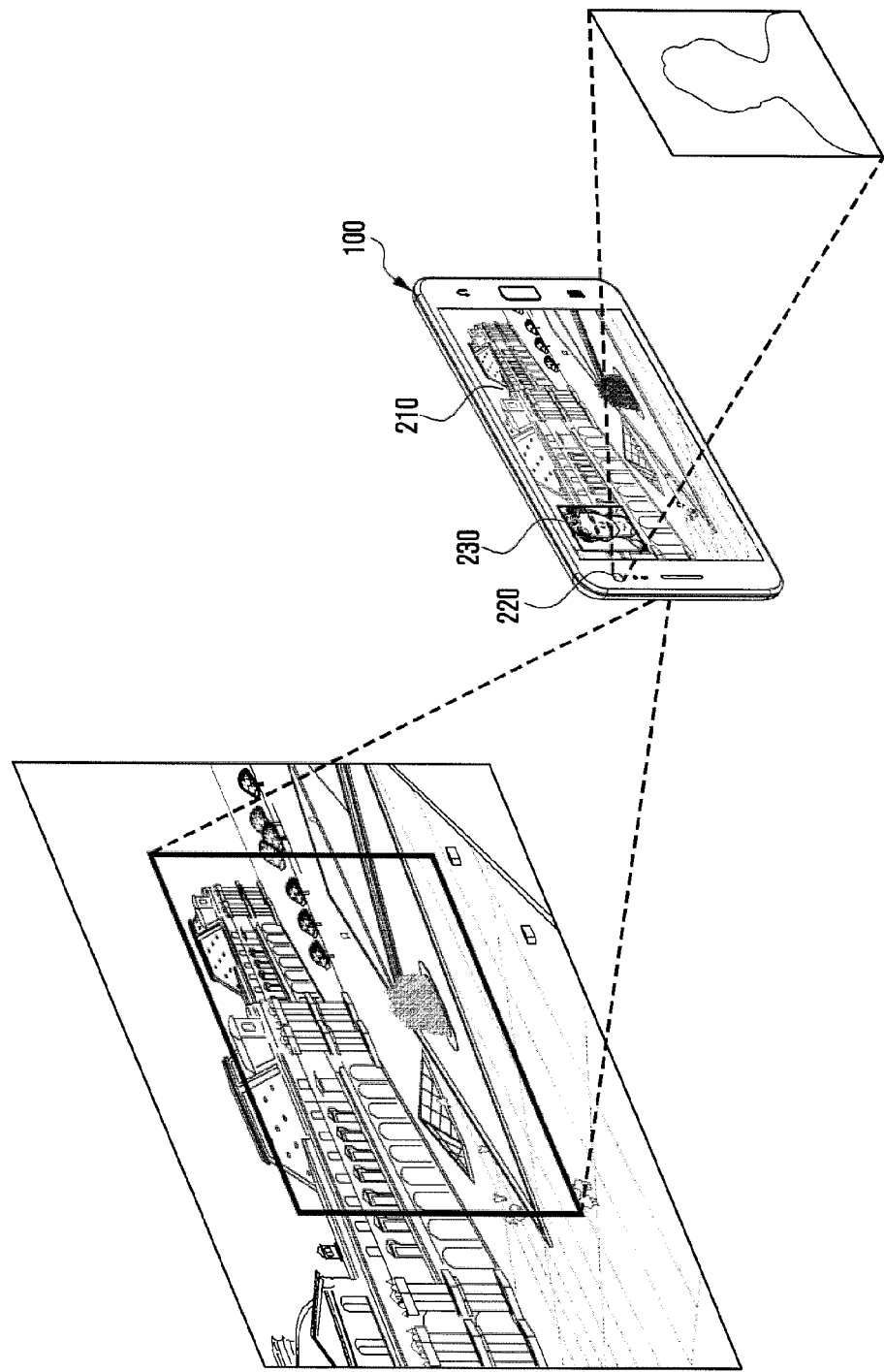
FIG. 2 is a concept view for describing an example of a preview mode according to the present disclosure.

FIG. 2 is a concept view for describing an example of a preview mode according to the present disclosure.

Referring to FIG. 2, the electronic device (e.g., the electronic device 100) operates in a single preview mode. For example, the controller 190 of the electronic device 100 can control the display unit 110 to display a preview image 210 of the rear camera (e.g., the first camera 160) on the screen.

The electronic device 200 may operate in a dual preview mode (e.g., the PIP preview mode). Hereinafter, an example of the PIP preview method will be described. The controller 190 determines whether or not a user's gesture is detected through the front camera (e.g., the second camera 170). When the user covers a lens window 220 of the second camera 170 by a touch input device (e.g. an index finger) and then uncovers the lens window 220, an image sensor of the front camera 170 detects a change in an amount of light, generates detection information relating thereto, and transfers the detection information to the controller 190. The controller 190 calculates an amount of a change by using the detection information, and when the amount of the change is larger than a predetermined threshold value, determines that the user's gesture is generated. When the user's gesture is detected through the second camera 170, the controller 190 may operate in a standby mode before switching from the single preview mode to the dual preview mode. For example, in the standby mode, the controller 190 may control the second camera 170 to generate the preview image, and may store the generated preview image in the memory.

When the user's gesture is detected through the second camera 170, the controller 190 determines whether or not the user's gesture is detected through the touch panel 111. Here, the user's gesture detected by the touch panel 111 may be the same as the user's gesture detected by the second camera 170. That is, the two gestures may be one continuous gesture. For example, the user can perform a continuous gesture (i.e., boundary-in) of touching the lens window 220 by the touch input device and moving the touch input device toward the inside of the screen. Of course, the user's gesture detected by the touch panel 111 may be different from the user's gesture detected by the second camera 170. That is, the two gestures may be discontinuous gestures. For example, the user may touch the lens window 220 by the touch input device and release the touch, and then perform a gesture (e.g., a tap) on the screen.

When a user's gesture is detected through the touch panel 111 within a predetermined time period (e.g., 1 second) after a user's gesture is detected through the second camera 170, the controller 190 operates in a PIP preview mode. That is, the controller 190 may control the display unit 110 to display a preview image 230 of the second camera 170, in the preview image 210. The controller 190 may control the display unit 110 to show the preview image 230 on a boundary of the screen which the touch input device enters, in response to a gesture in which the touch input device enters the screen. That is, the display unit 110 may provide a visual feedback in which the preview image 230 is displayed on the boundary of the screen, to the user.

Another example of the PIP preview method will be described. The controller 190 may display a preview image of the first camera 160 or the second camera 170 on the screen. Further, the controller 190 may store a preview image of the first camera 160 or the second camera 170 in the memory. That is, the electronic device 100 may operate in a single preview mode in which only one of the preview images is displayed. In this state, when a boundary-in (for example, a gesture which moves from the lens window 220 or another place toward the inside of the screen) is detected, the controller 190 may operate in the PIP preview mode. For example, as illustrated in FIG. 2, the preview image 210 may be displayed as a main part, and the preview image 230 may be displayed as a sub part. Otherwise, although not illustrated, the preview image 210 may be displayed as a sub part, and the preview image 230 may be displayed as a main part.

Another example of the PIP preview method will be described. The user performs a gesture of shaking a hand in a state in which the touch input device (e.g., a hand) is adjacent to the lens window 620. In response to this, the controller 190 may change the preview mode from the single preview mode to the PIP preview mode.

An example of a method of moving a sub preview image in a PIP preview mode will be described. The controller 190 may detect a touch of the touch input device (e.g., an index finger) for the preview image 230, and then detect the movement of the index finger. The controller 190 may control the display unit 110 to display the preview image 230 on another place, in response to the movement of the index finger.

An example of a method of changing a size of a sub preview image in a PIP preview mode will be described. The controller 190 may detect a pinch-out or a pinch-in of the touch input device (e.g., using a thumb and an index finger) for the preview image 230. The controller 190 may enlarge the preview image 230 in response to the pinch-out, or may reduce the preview image 230 in response to the pinch-in.

An example of a method of converting an electronic device from a PIP preview mode to a single preview mode will be described. The controller 190 may detect a touch of the touch input device (e.g., using an index finger) for the preview image 230, detect the movement of the index finger, and detect a boundary-out in which the index finger deviates toward the outside of the screen. The controller 190 may operate in the single preview mode, in response to the boundary-out. For example, only the preview image 210 is displayed.

FIGS. 3A, 3B, 3C and 3D are screens for describing an example of a procedure of changing a property of a sub preview image.

Figure 3A:
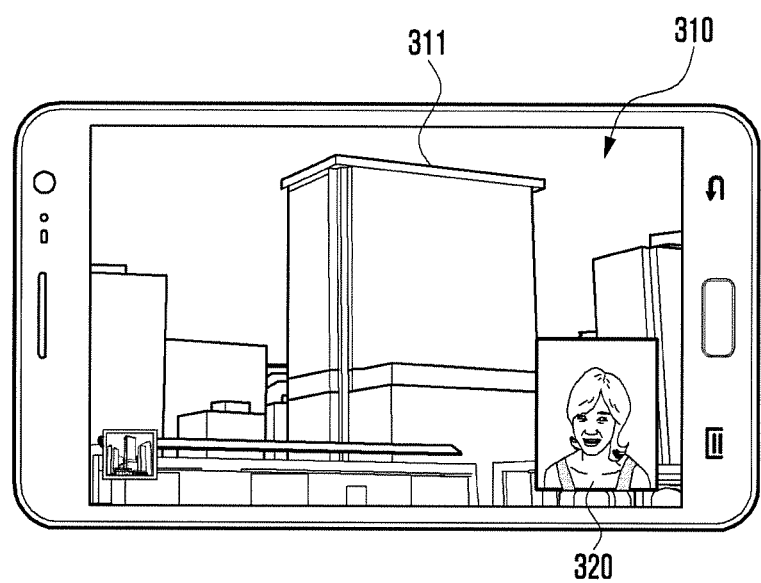
FIGS. 3A, 3B, 3C and 3D are screens for describing an example of a procedure of changing a property of a sub preview image.

Referring to FIG. 3A, the controller (e.g., the AP) 190 of the electronic device 100 can control the display unit 110 to display a preview image 310 of the rear camera (e.g., the first camera 160) on the screen. Further, the controller 190 may control the display unit 110 to display a preview image 320 of the front camera (e.g., the second camera 170), in the preview image 310. A transparency of the preview image 320 may be set to a value by which an image behind the preview image 320 is covered.

Figure 3B:
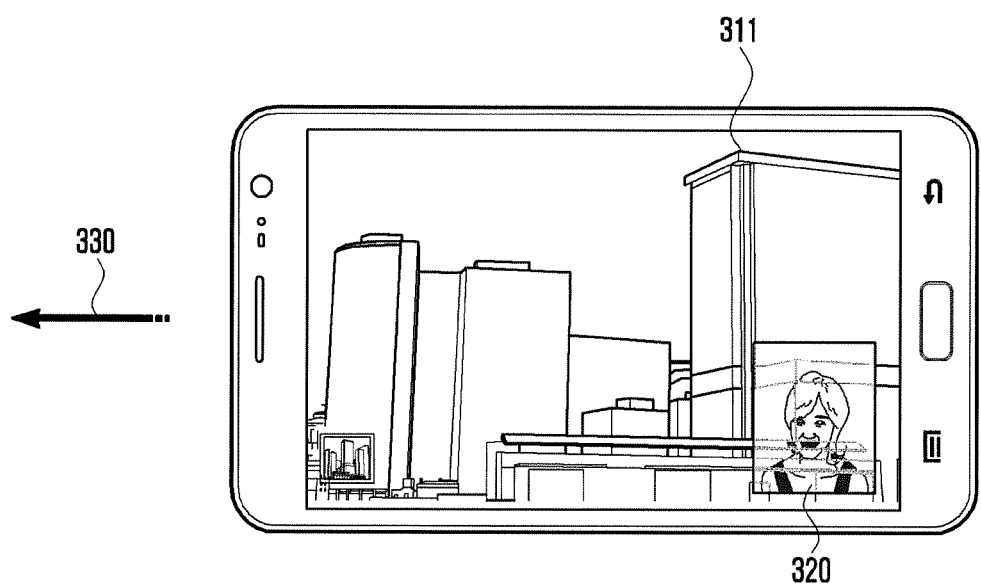

Referring to FIG. 3B, the user moves the electronic device to a left side 330. Then, a structure of the preview image 310 is changed. For example, a specific subject 311 moves to a right side as compared to FIG. 3A. Then, the controller 190 can recognize a physical quantity implying a movement of an electronic device, through the sensor unit 180, and can control the display unit 110 to semi-transparently display the preview image 320, in response to the movement of the electronic device. That is, the controller 190 can change the transparency of the preview image 320 to be a value by which an image behind the preview image 320 can be shown. Further, the controller 190 may control the display unit 110 to display the preview image 320 adjusted transparently, in the preview image 310. In some embodiments, only the transparency is adjusted, and a display location of the preview image 320 can be fixed without a change. Thus, the user can show the specific subject 311 without inconvenience even when a location of the preview image 320 is not changed.

Figure 3C:
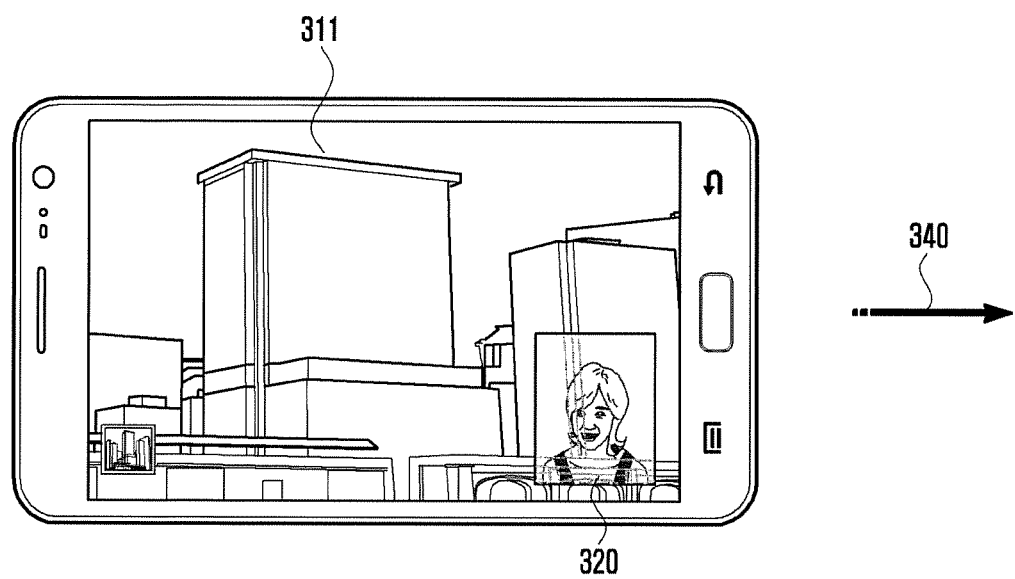

Referring to FIG. 3C, the user can change the movement direction of the electronic device to a right side 340. Then, a specific subject 311 moves to a central side of the screen as compared with FIG. 3B. Further, the controller 190 can continuously recognize the movement of the electronic device, and can maintain the transparency of the preview image 320 such that the image behind the preview image 320 is shown.

Figure 3D:
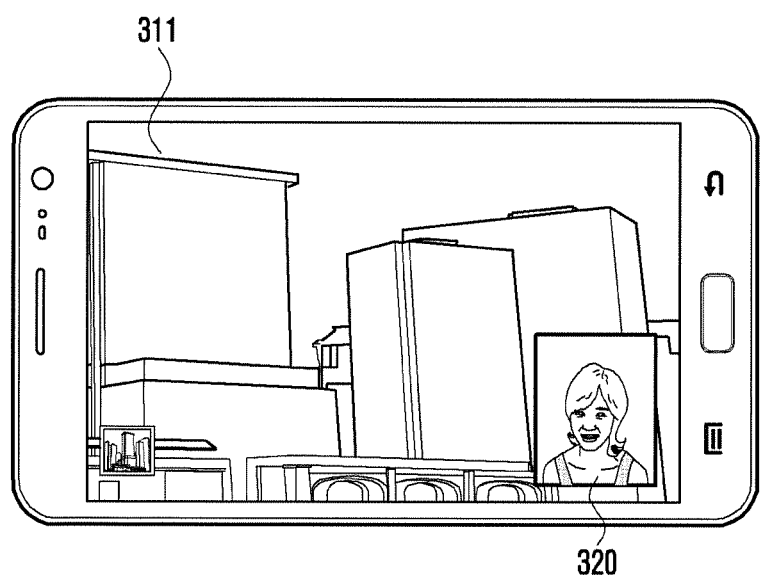

Referring to FIG. 3D, the user can stop moving the electronic device. Then, the controller 190 can recognize a physical quantity implying stopping of the electronic device (e.g., a speed value smaller than a predetermined threshold value), and can change the transparency of the preview image 320 to be a value by which an image behind the preview image 320 is covered. That is, the preview image 320 may be displayed opaquely.

According to the embodiment, the transparency of the sub preview image is adjusted. However, the present disclosure is not limited thereto, and other properties of the sub preview image can be adjusted. For example, the controller 190 can reduce the sub preview image without a location change, in response to the movement of the electronic device. The controller 190 can restore a size of the sub preview image to its original size, in response to the stopping of the electronic device. Further, the size adjustment and the transparency adjustment can be simultaneously executed. Otherwise, the controller 190 can terminate displaying the sub preview image in response to the movement of the electronic device. The controller 190 can control the display unit 110 to display the sub preview image again, in response to the stopping of the electronic device.

According to the above embodiment, a condition to adjust the transparency or the size or to determine whether to display a sub preview image corresponds to the movement of the electronic device. However, the present disclosure is not limited thereto, and even by other conditions, the transparency or the size of the sub preview image can be adjusted or whether to display a sub preview image can be determined. For example, when functions relating to the main preview image (e.g., manual focus adjustment, zoom-in, zoom-out, etc. for the main preview image) are executed, the sub preview image may be semi-transparently displayed without a change in a display location thereof. When the functions are terminated, the sub preview image may be opaquely displayed. Otherwise, when the functions are executed, the sub preview image may be reduced without the change in the display location thereof. When the functions are terminated, the sub preview image may be restored to its original size. Otherwise, when the functions are executed, the sub preview image may disappear. When the functions are terminated, the sub preview image may be displayed again.

Figure 4:
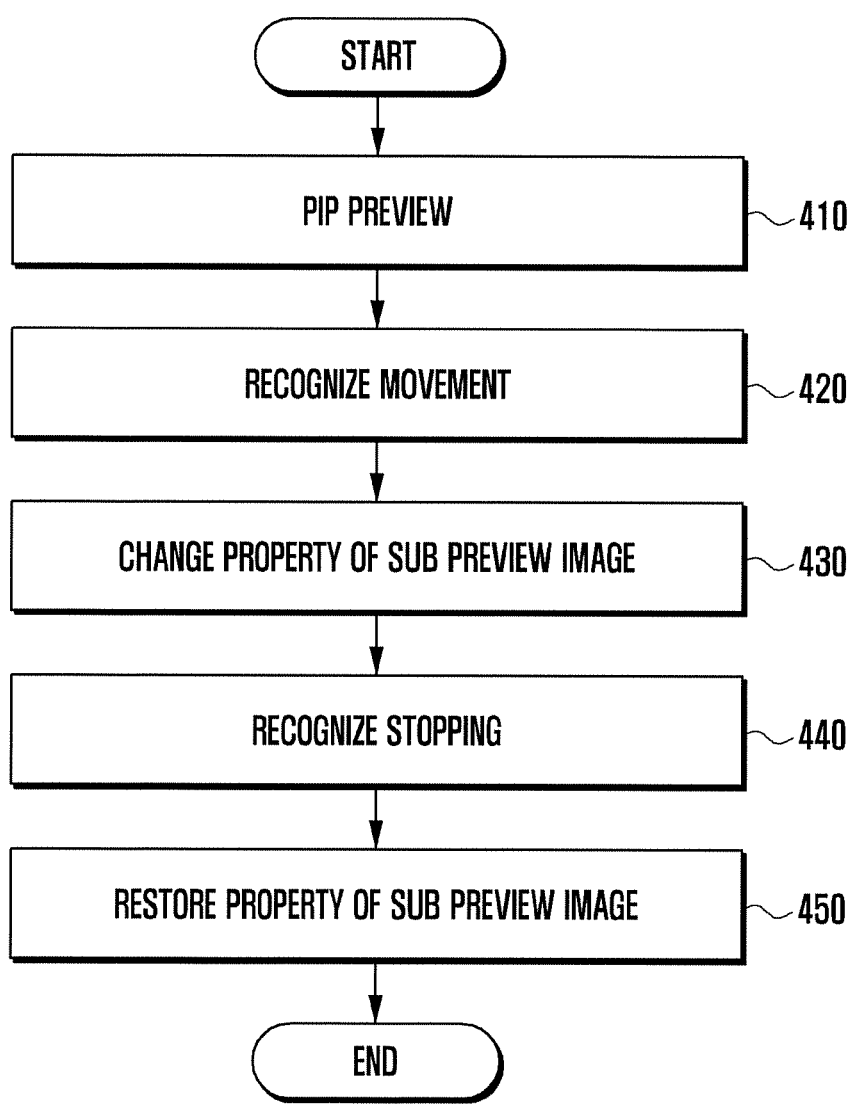
FIG. 4 is a flowchart illustrating a method of performing previewing according to an embodiment of the present disclosure.

FIG. 4 is a flowchart illustrating a method of performing previewing according to an embodiment of the present disclosure.

Referring to FIG. 4, in operation 410, the electronic device (e.g., the electronic device 100) may operate in a PIP preview mode. In operation 420, the electronic device 100 can recognize its own movement. In operation 430, the electronic device 100 may change a property of a sub preview image in response to its own movement. For example, the electronic device 100 may change the transparency thereof to a value by which the sub preview image is to be displayed semi-transparently, without a change in a display location of the sub preview image. Further, the electronic device 100 may reduce the sub preview image without the change in the display location of the sub preview image. In contrast, the electronic device 100 may terminate displaying of the sub preview image. In operation 440, the electronic device 100 can recognize stopping of its own movement. When the electronic device stops moving, in operation 450, the electronic device 100 may restore a property of the sub preview image to its original property.

Figure 5:
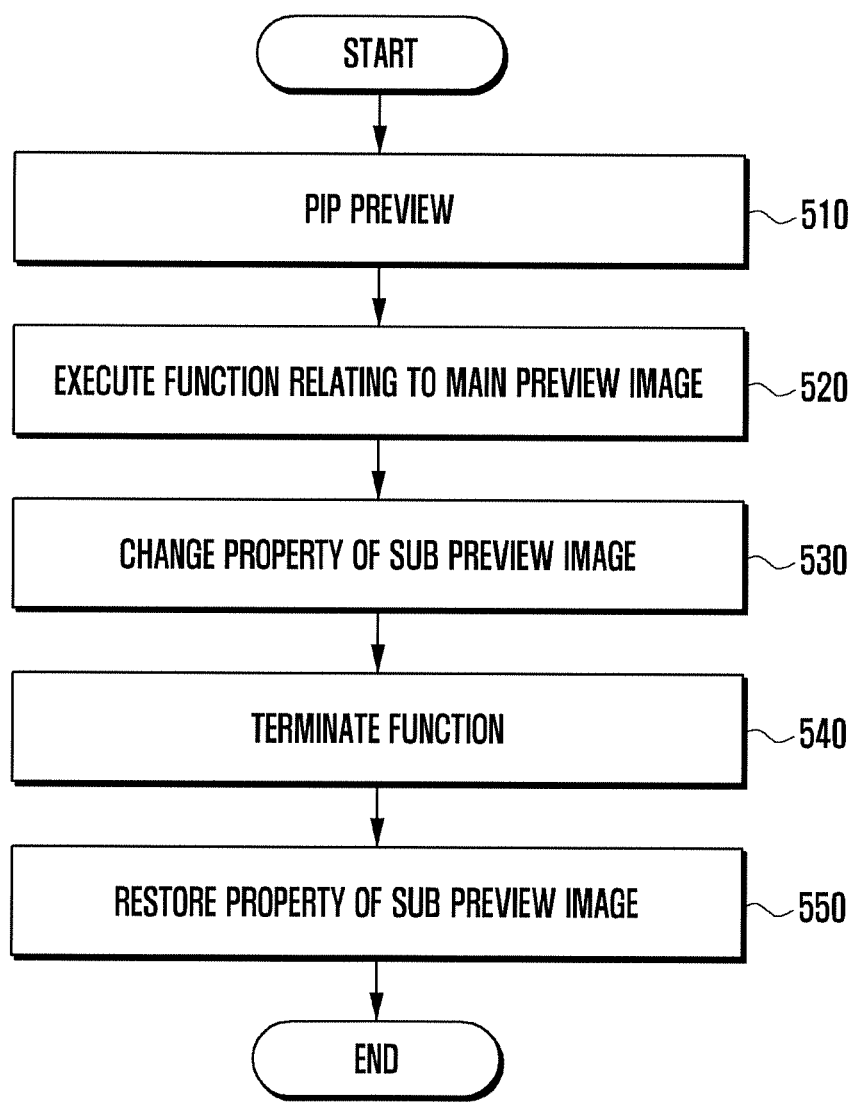
FIG. 5 is a flowchart illustrating a method of performing previewing according to another embodiment of the present disclosure.

FIG. 5 is a flowchart illustrating a method of performing previewing according to another embodiment of the present disclosure.

Referring to FIG. 5, in operation 510, the electronic device (e.g., the electronic device 100) may operate in a PIP preview mode. In operation 520, the electronic device 100 may execute functions relating to the main preview image (e.g., manual focus adjustment, zoom-in, zoom-out, etc.). When the functions are executed, in operation 530, the electronic device 100 may change the property of the sub preview image (e.g., transparency adjustment, size adjustment, display termination). In operation 540, the electronic device 100 can terminate execution of the function. When the execution is terminated, in operation 550, the electronic device 100 can restore a property of the sub preview image to its original property.

The method according to the disclosure as described above may be implemented as one or more program commands which can be executed through various computers and recorded in a computer-readable recording medium. The program commands may be specially designed and configured for the present disclosure or may be used after being known to those skilled in computer software fields. The recording medium may include magnetic media such as a hard disk, a floppy disk and a magnetic tape, optical media such as a Compact Disc Read-Only Memory (CD-ROM) and a Digital Versatile Disc (DVD), magneto-optical media such as a floptical disk, and hardware devices such as a Read-Only Memory (ROM), a Random Access Memory (RAM) and a flash memory. Further, the program command may include machine language code generated by a compiler and high-level language code executable by a computer through an interpreter and the like.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method of previewing images photographed by a plurality of cameras, by an electronic device, the method comprising:
   displaying a main preview image of a first one of the cameras, and displaying a sub preview image of a second one of the cameras in the main preview image;
   changing a property of the sub preview image in response to a movement of the electronic device; and
   when the movement of the electronic device stops, restoring the changed property to an original property before the changing.

2. The method of claim 1, wherein the changing of the property of the sub preview image comprises at least one of:
   changing the sub preview image to be semi-transparent; and
   reducing a size of the sub preview image.

3. The method of claim 1, wherein the changing of the property of the sub preview image comprises one of:
   changing the sub preview image to be semi-transparent without a change in a display location of the sub preview image;
   reducing a size of the sub preview image without the change in a display location of the sub preview image; or
   terminating the displaying of the sub preview image.

4. The method of claim 1, further comprising:
   determining when the movement of the electronic device stops.

5. The method of claim 1, wherein the electronic device is a smart phone.

6. An electronic device comprising:
   a plurality of cameras;
   a display unit configured to preview images photographed by the cameras;
   a sensor unit configured to detect a movement of the electronic device; and
   a processor configured to:
      control the display unit to display, in a main preview image of a first one of the cameras, a sub preview image of a second one of the cameras;
      change a property of the sub preview image in response to the movement of the electronic device; and
      restore the changed property to an original property before the changing when the movement of the electronic device stops.

7. The electronic device of claim 6, wherein to change the property of the sub preview image, the processor is configured to at least one of:
   change the sub preview image to be semi-transparent; and
   reduce a size of the sub preview image.

8. The electronic device of claim 6, wherein to change the property of the sub preview image, the processor is configured to one of:
   change the sub preview image to be semi-transparent without a change in a display location of the sub preview image;
   reduce a size of the sub preview image without the change in a display location of the sub preview image; and
   terminate the displaying of the sub preview image.

9. The electronic device of claim 6, wherein the processor is further configured to determine when the movement of the electronic device stops.

10. The electronic device of claim 6, wherein the electronic device is a smart phone.

* * * * *